UNITED STATES PATENT OFFICE.

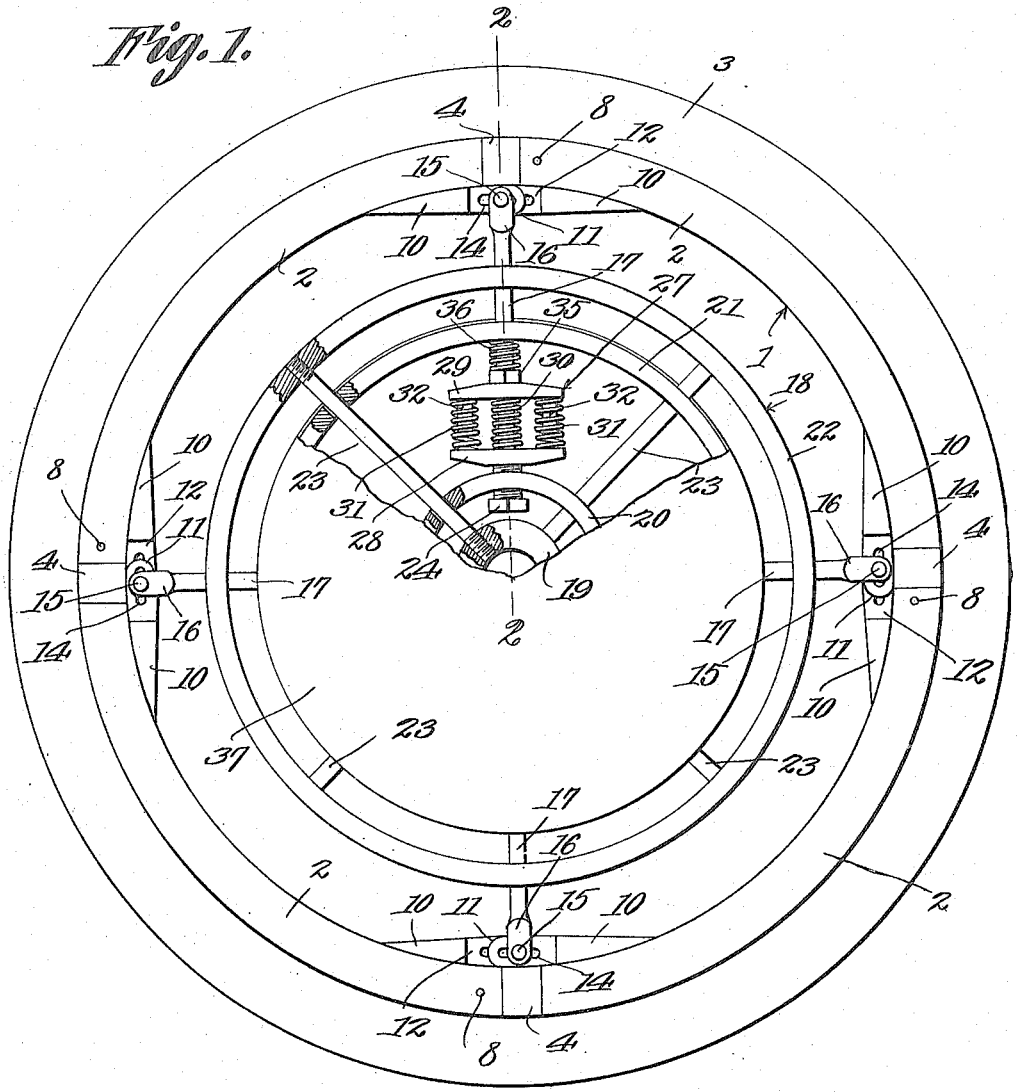

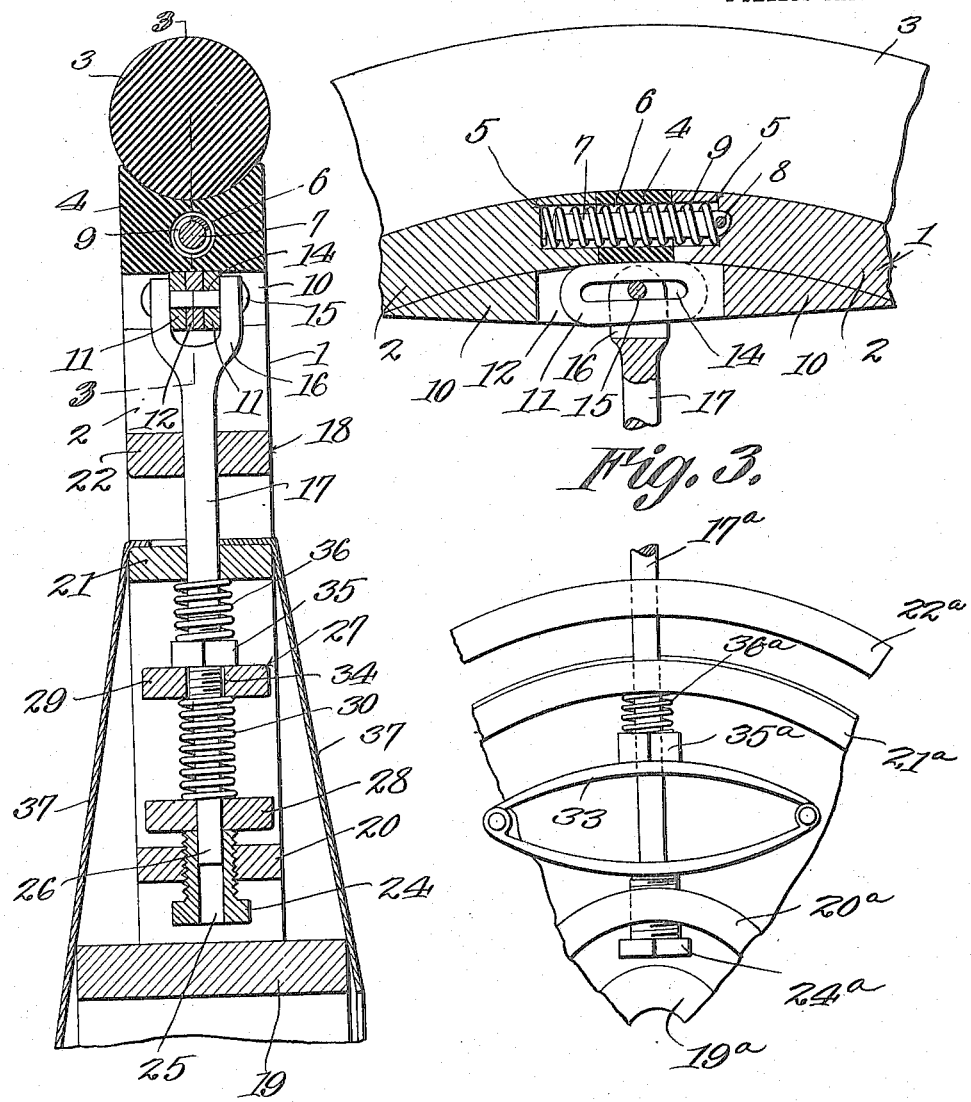

SCHUYLER COLFAX BURSON, OF AXTELL, KANSAS, ASSIGNOR OF ONE-HALF TO DORUS H. PIPER, OF AXTELL, KANSAS.

AUTOMOBILE-WHEEL.

1,131,324. Specification of Letters Patent. Patented Mar. 9, 1915.

Application filed June 2, 1913. Serial No. 771,283.

*To all whom it may concern:*

Be it known that I, SCHUYLER COLFAX BURSON, a citizen of the United States, residing at Axtell, in the county of Marshall and State of Kansas, have invented a new and useful Automobile-Wheel, of which the following is a specification.

The device forming the subject matter of this application is a resilient wheel, and one object of the invention is to provide a yielding rim of novel and improved form.

Another object of the invention is to provide resilient means of novel and improved form for connecting the rim operatively with the body portion of the wheel.

It is within the scope of the invention to improve generally and to enhance the utility of, devices of that type to which the present invention appertains.

With the above and other objects in view which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

In the drawings:—Figure 1 shows the invention in side elevation, parts being broken away; Fig. 2 is a section on the line 2—2 of Fig. 1; Fig. 3 is a section on the line 3—3 of Fig. 2; Fig. 4 is a side elevation showing a slightly modified form of the invention.

In carrying out the invention there is provided a rim 1 which may be fashioned from any desired material. The rim 1 comprises a plurality of sections 2, of which sections there may be any number. In order to simplify the drawings, but four sections 2 are shown, but this number may be varied as the taste of the manufacturer may dictate. The rim 1 supports a tire 3 which may be of any desired form, although, preferably, an imperforate rubber tire is used. Interposed between the ends of the sections 2 of the rim 1 is a resilient structure, this structure preferably comprising, in each instance, a block 4 which ordinarily is of rubber. In the end faces of the sections 2 of the rim 1 there are recesses 5, alined with a passage 6 in the block 4. Located in the recesses 5 and in the passage 6 is a pin 7 which may be pivoted to one rim section 2 as indicated at 8. The free end of the pin 7 is spaced apart from one rim section 2, so that the rim sections may move in a longitudinal direction with respect to each other when the block 4 is compressed. In the recesses 5 and in the passage 6 is a compression spring 9 which surrounds the pin 7, the ends of the spring 9 abutting against the sections 2 at the bases of the recesses 5.

Supports 10 are secured to the sections 2 of the rim 1, the supports 10 to all intents and purposes constituting a part of the rim 1. One of the supports 10 is provided with ears 11, between which is received a tongue 12, formed upon the other support 10. The ears 11 and the tongues 12 are slotted, in alinement, and circumferentially of the rim 1, as indicated at 14. Mounted to reciprocate in the slots 14, circumferentially of the rim 1, but held in the slots against movement radially of the rim 1, is a securing element 15, connected with spaced arms 16, formed upon the outer end of a spoke 17.

The body of the wheel is denoted generally by the numeral 18 and comprises a hub 19, a primary intermediate ring 20, a secondary intermediate ring 21, an outer ring 22 and spokes 23 extended between the hub and the several rings. It will be understood that, if desired, the body 18 as above described may be cast or otherwise formed in one piece. Threaded into the inner primary ring 20 is a tubular sleeve 24, within the bore 25 of which, the inner end 26 of the spoke 17 is slidably received.

The spoke 17 is mounted to slide in a yieldable frame, denoted generally by the numeral 27. The frame 27 comprises an inner head 28 and an outer head 29, the outer end of the tubular sleeve 24 bearing against the inner face of the inner head 28. A compression spring 30 surrounds the spoke 17 and bears against the heads 28 and 29 of the frame 27. Other springs 31, located upon opposite sides of the spring 30, bear against the heads 28 and 29. Upon one or both of the heads 28 and 29, as may be found expedient, are located studs 32 which engage the ends of the springs 31 and serve to hold the same in place. The spoke 17 is threaded throughout a portion of its length as indicated at 34, to receive a nut 35 which bears against the outer head 29. A compression spring 36 is interposed between the nut 35 and that portion of the body of the wheel which is represented by the secondary intermediate ring 21.

If desired, cover plates 37, held in place by any suitable means, may be applied to opposite faces of the body 18, of the wheel, so as to house and protect the resilient, spoke supporting and adjusting structures hereinbefore referred to.

Operation: When any one spoke is vertically disposed, the pressure imposed upon the tire 3 will be carried from the tire 3 into the rim 1 and thence into the spoke 17, the nut 35 carrying the weight into the head 29 and thence into the springs 30 and 31 which will be compressed, the head 28 constituting an abutment for the springs, and the weight being carried thence by way of the adjusting sleeve 24 into the ring 20 and thence into the hub 19 of the wheel.

The sleeve 24 is adjustable to vary the compression afforded by the springs 30 and 31, and this result may be accomplished by adjusting the abutment nut 35. The spring 36 serves to limit the outer movement of the spoke 17 and serves also as a means for preventing the nut 35 from rotating, after it has been adjusted.

The pin 7 serves to limit the transverse movement of the sections 2 with respect to each other. When, however, the adjacent ends of any one pair of sections 2 are positioned at the side of the wheel and are disposed in a substantially horizontal plane, both the block 4 and the spring 9 will yield, circumferentially of the rim, thus giving the rim resiliency. The spoke 17, however, is not strained, because the spoke is connected with the rim for movement circumferentially of the rim, the securing elements 15 being adapted to move in the slots 14.

Modification: Referring to Fig. 4, the parts hereinbefore described are designated by reference characters previously employed, with the suffix "a." In this form of the invention, the yieldable frame 27 hereinbefore described, together with accessory parts, is replaced by a double convexed spring 33. The operation of the structure shown in Fig. 4 need not be entered into in view of the discussion of that form of the invention which is shown in Fig. 1.

Referring to Fig. 4 of the drawings, the springs 33 and 36ª may be described as resilient, compressive structures abutting at their remote ends against the rim parts, there being an abutment 35ª on the spoke and engaging the adjacent ends of the resilient structures. Referring to Fig. 1, one of the resilient structures is shown at 36 and the other of the resilient structures embraces the elements 29, 31 and 28, the abutment being shown at 35.

Having thus described the invention, what is claimed is:—

1. In a wheel, a rim comprising sections; a resilient block located between the ends of the sections; a pin terminally mounted in the rim sections and extended through the block; a compression spring surrounding the pin and extended through the block and engaged with the rim sections; and a spoke assembled with the rim.

2. In a wheel, a rim comprising sections; a resilient block interposed between the ends of the sections; a pin terminally mounted in the sections and extended through the block; a compression spring extended through the block and surrounding the pin, the spring abutting against the sections; and a spoke connected with the rim for movement circumferentially of the rim.

3. In a wheel, a rim comprising sections; a resilient block interposed between the sections; a pin extended through the block and terminally mounted in the sections; and a spoke having pin and slot connection with the rim, permitting the spoke to move circumferentially of the rim.

4. In a wheel, a rim comprising sections; a spring interposed between the sections; a pin extended through the spring and terminally engaged with the sections; and a spoke connected with the rim by a pin and slot connection to permit the outer end of the spoke to move circumferentially of the rim.

5. In a spring wheel, a body comprising radially spaced inner and outer parts; a spoke slidable in said parts; a rim carried by the spoke and movable independently of the body; resilient, compressive structures abutting at their remote ends against said parts; and an abutment on the spoke and engaging the adjacent ends of the resilient structures, the abutment being movable upon the spoke to adjust both resilient structures at once.

In testimony that I claim the foregoing as my own, I have hereto affixed my signature in the presence of two witnesses.

SCHUYLER COLFAX BURSON.

Witnesses:
JOHN LIEHTY,
JOHN U. PAYNE.